United States Patent

[11] 3,634,630

[72] Inventor Chikai Ii
Yokohama, Japan
[21] Appl. No. 868,768
[22] Filed Oct. 23, 1969
[45] Patented Jan. 11, 1972
[73] Assignee Hitachi, Ltd.
Tokyo, Japan
[32] Priority Nov. 4, 1968
[33] Japan
[31] 43/80469

[54] COMMUNICATION CHANNEL HOLDING SYSTEM FOR AN AUTOMATIC TELEPHONE EXCHANGE
2 Claims, 4 Drawing Figs.

[52] U.S. Cl. .......... 179/18 FH
[51] Int. Cl. .......... H04q 3/72
[50] Field of Search .......... 179/18 FH

[56] References Cited

UNITED STATES PATENTS 3,431,364 3/1969 Siegel .......... 179/18 FH
3,385,933 5/1968 Abert et al. .......... 179/18 FH

*Primary Examiner*—Kathleen H. Claffy
*Assistant Examiner*—Thomas W. Brown
*Attorney*—Craig, Antonelli, and Hill

ABSTRACT: A system for holding a communication channel for a purpose such as malicious call tracing in an automatic telephone exchange, by permitting the calling party, who is being traced, to originate a new call even when the original communication channel is held for tracing.

COMMUNICATION CHANNEL HOLDING SYSTEM FOR AN AUTOMATIC TELEPHONE EXCHANGE

The present invention relates to means for holding communication channels in an automatic telephone exchange.

In an automatic telephone exchange, when a special call, that is, a call to the police, or firemen, or a malignant call occurs, it is wished to detect the calling party of such a special call. For this purpose, it has been common practice to hold, with a called party control mode, the communication line or channel by a trunk line apparatus to which the calling party's telephone is connected and detect the calling party.

However, according to this method, since the communication line leading to the calling party's telephone is held, even when the calling party hangs up his telephone handset, the communication circuit of his telephone is maintained in an engaged condition. Therefore, this method is disadvantageous in that the calling party's telephone is prevented from being used for a new call while the method is being carried out. In order to overcome this disadvantage and allow the calling party's telephone to be used for a new call, there have been proposals to increase the number of wires of the communication channel, that is, to provide two control wires, or sleeve wires comprising a control wire for the communication circuit and a control wire for holding the communication channel, or alternatively, to utilize the marginal characteristics of the relay means in the communication circuit of the calling party's telephone and that of the communication line holding magnet.

However, according to the former method, the number of contacts and thus the cost of the telephone system will be increased, while according to the latter method, the components of the system will be subjected to severe requirements and frequent readjustment will often be required.

The present invention is aimed at eliminating the aforementioned disadvantages and makes it possible to hold a communication channel for detecting the calling party and at the same time enables his telephone to be used for a new call. Other objects, features and advantages will be explained in detail with reference to the accompanying drawings, in which.

Figure 1:
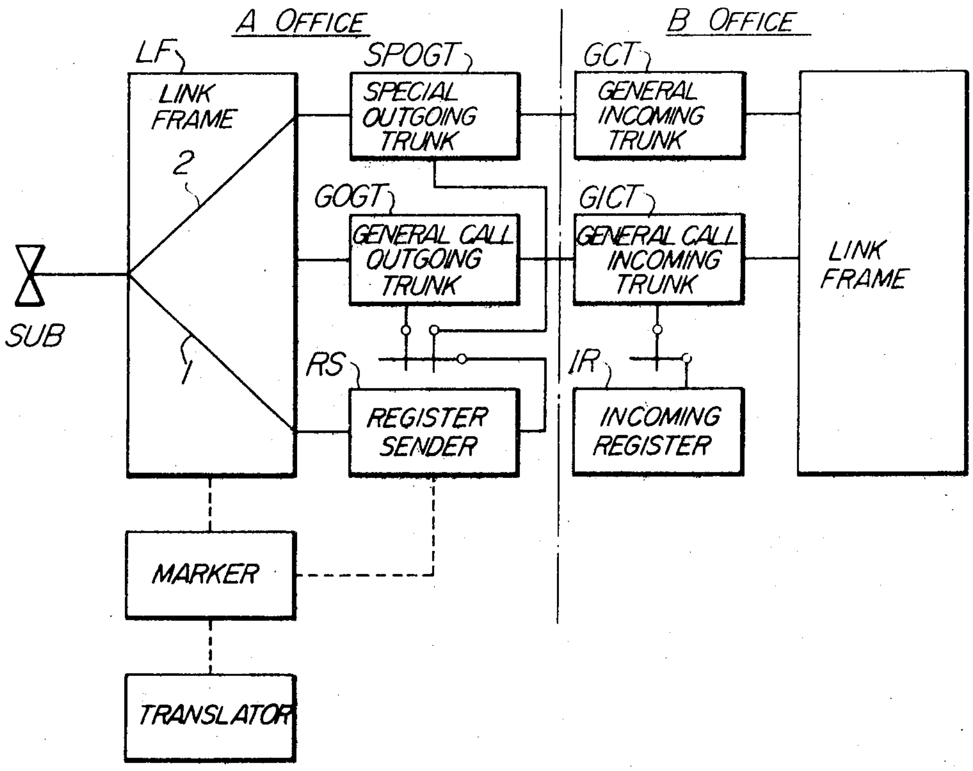
FIG. 1 is a block diagram showing one embodiment of the present invention.
Figure 2:
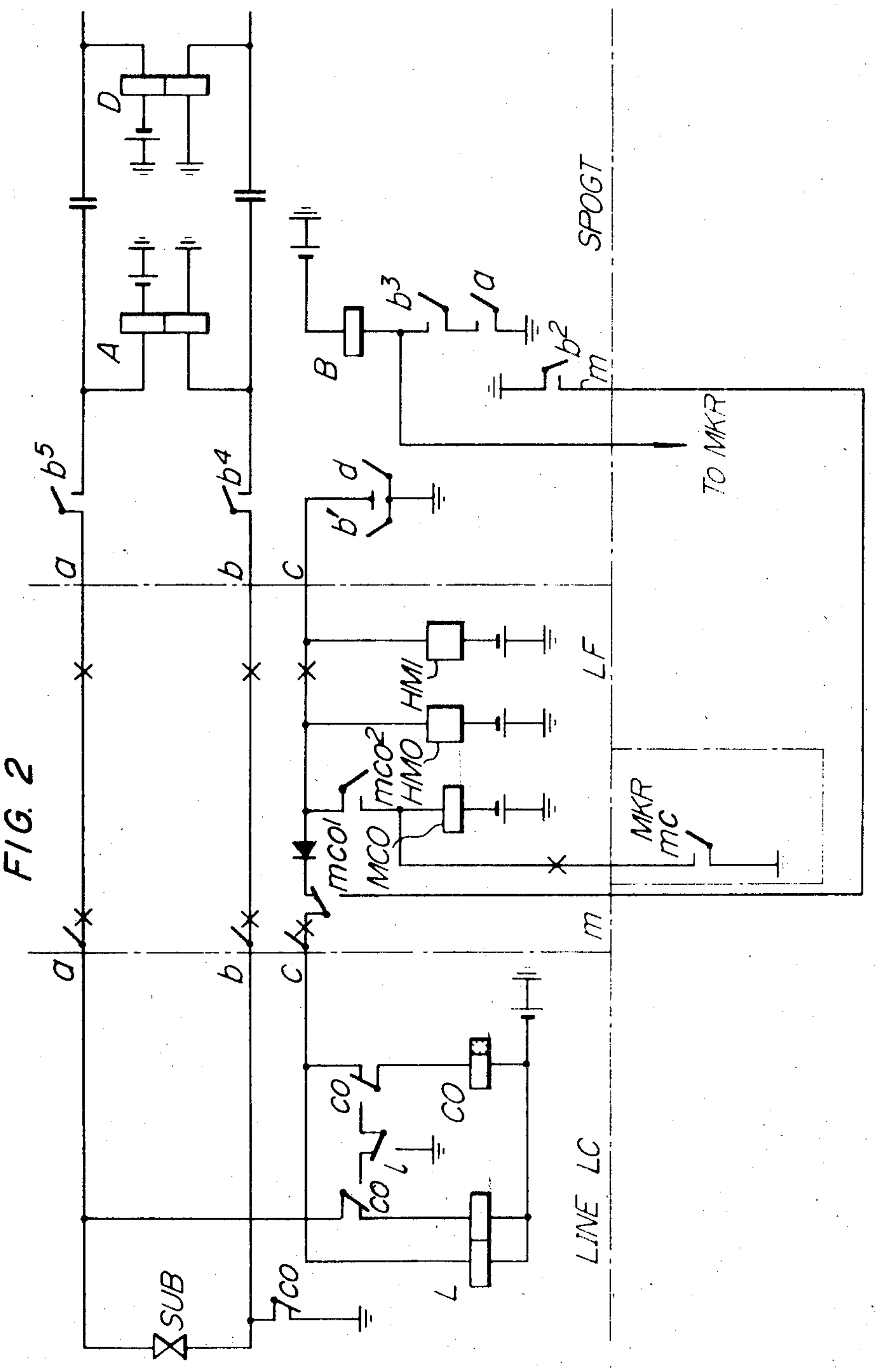
FIG. 2 is a circuit diagram used in the embodiment shown in FIG. 1.

In FIGS. 1 and 2, there is shown the first embodiment of the present invention. In this embodiment, the present invention is applied to a telephone exchange system in which the sending office can discriminate from the telephone number of the receiver whether the caller shall be detected or not.

In the block diagram of FIG. 1, when the telephone handset of the calling party is taken, his telephone SUB is connected, under the control of the control means, or marker MKR, through a channel 1 of a link frame LF to a register sender RS. Then, the calling party dials the telephone number of the called party and the number is counted and stored in the register sender RS. When the register sender received all of or the necessary figures of the called party's telephone number, the register sender RS makes the marker MKR start the transfer of the called party's telephone number. The marker MKR can discriminate through a translator TLR that the called party is the one needing detection whose calling party shall be detected. Thus, between a general outgoing trunk GOGT and a special outgoing trunk SPOGT, both of which are disposed between the originating office A and the terminating office B, the latter one is selected and the calling party's telephone SUB and the selected special outgoing truck SPOGT are connected with each other through a channel 2 of the link frame LF. Thereafter, the telephone number of the called party is transmitted to the terminating office B to complete the connection to the called party's telephone by any known means.

FIG. 2 shows a circuit diagram of the calling party's line circuit LC, the link frame LF and the special trunk SPOGT, which have a direct relation to the present invention. The calling party's line circuit LC comprises a conventional circuit having a line relay L and a cutoff relay CO. In the illustrated embodiment, the link frame LF is of a two-stage switch type and holding magnets for the first and second stage switches are shown by references HMO and HMl and cross points are shown by the symbol X.

These cross points are connected by means of wires and constitute a link comprising ring wire *a* and tip wire *b* and a sleeve wire *c*. Further, in the link frame LF, there is shown a relay MCO with contacts $mco^1$and $mco^2$which is related to the present invention. In the trunk SPOGT, there are shown a calling party monitoring relay A, a called party monitoring relay D and a B position relay B. When the connection is set up between the calling party's telephone SUB and the special trunk SPOGT as previously described, the relay B in the trunk SPOGT is momentarily energized by the marker MKR, whereby the contacts $b^5$ and $b^4$ of the relay B, disposed in the ring and tip wires *a* and *b* are respectively closed, so that the relay A is energized in a loop of the calling party's telephone SUB. Thus, a relay A completes, with its contact, a holding circuit for the relay B.

On the other hand, since the marker MKR is informed, by means of a translator (not shown in FIG. 2), of the fact that the calling party is the one who shall be detected, the relay MCO in the link frame LF is energized. The relay MCO is connected through its own contact $mico^2$ with the sleeve wire *c*, and is held together with the first and second stage holding magnets HMO and HM1 through a ground circuit having a contact $b^2$ of the trunk SPOGT. When the relay MCO is energized, the wire *c* leading to the calling party's line circuit LC is connected to the wire *m* of the trunk SPOGT by the contact $mco^1$ of the relay MCO, the line *m* being in turn connected to the earth through the contact $b^2$. Thus, the relays L and CO of the line circuit LC of the calling party's telephone are put into parallel operation.

The operation in which the calling party is detected will now be described. This operation can be done in various ways, and among them, a method in which the called party continues the response by holding his telephone handset up will be described. In this case, as long as the called party holds his telephone receiver up, the relay D of the trunk SPOGT is maintained in its energized condition. Therefore, even after the calling party puts his telephone handset on and thus the relays A and B of the trunk SPOGT are released, the communication channel is held by means of the contact *d*. When the caller hangs up his telephone receiver, relays A and B of the trunk SPOGT release. Therefore, relays L and CO are restored since the contact $b^2$ of the lead m of the trunk SPOGT is opened, whereby relays L and CO corresponding to the calling party are released.

Thus, when the calling party again takes up his telephone handset to originate a new call, the relay L is energized and a normal communication can be made. In this instance, since the relay B is deenergized, the wires *a* and *b* which are held in a connected position within the link frame LF are separated from the circuit of the trunk SPOGT by means of the contacts $b^4$ and $b^5$ and the sleeve wire *c* is also switched by the contact $mco^1$, so that the calling party's telephone SUB will not be prevented from making the new call.

Figure 3:
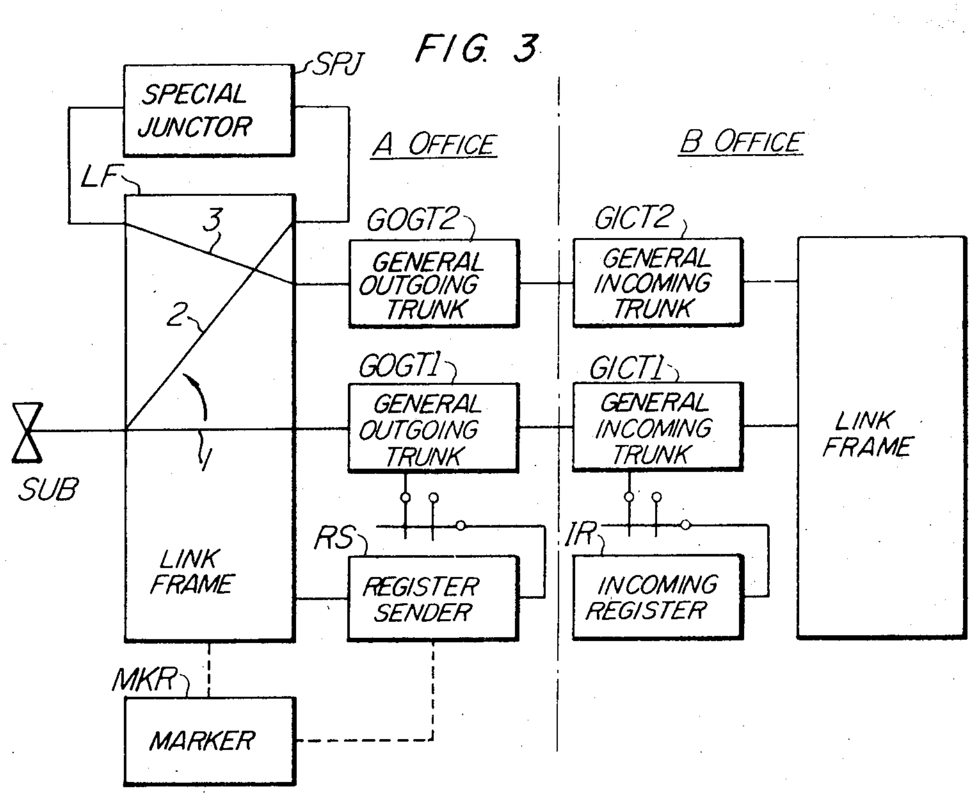
FIGS. 3 and 4 are block diagrams showing other embodiments of the present invention.
Figure 4:
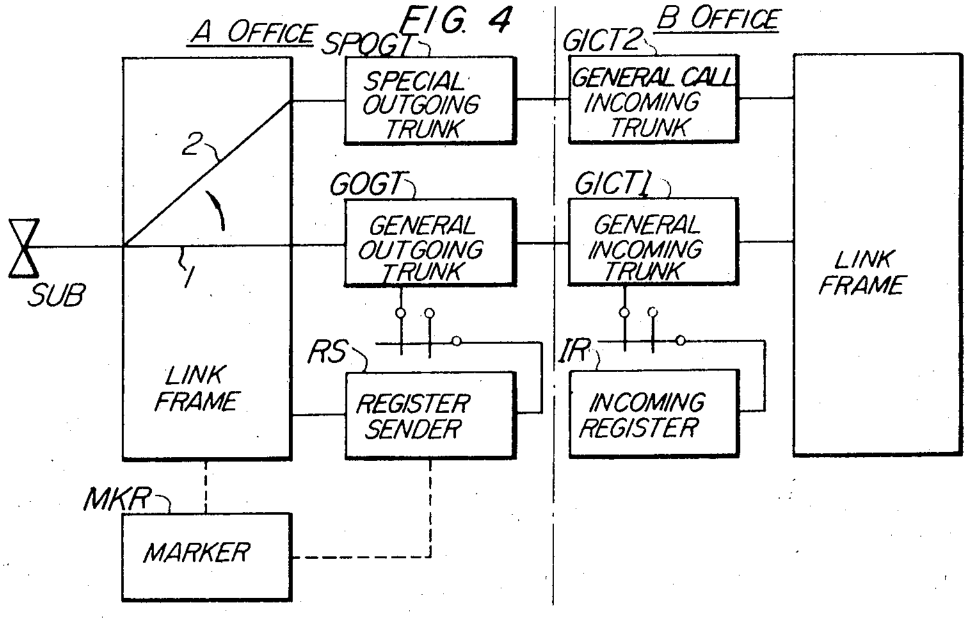

FIG. 3 and 4 are block diagrams showing further embodiments of the present invention. More particularly, in these embodiments, the present invention is applied to a switching network having an end-to-end signal system in which the originating office can obtain the information that the called party is the one whom a special call may terminate to, by means of a backward signal sent from the terminating office.

In FIGS. 3 and 4, the originating office A first sends the called party's telephone number by a general outgoing trunk GOGT and a register sender RS to the terminating office B. As soon as the register sender RS of the originating office A receives, from the register IR of the terminating office B, the information that the called party is the one whom a special call may terminate to; the channel 1 for the register sender RS and the general trunk GOGT releases and the register sender RS and the marker MKR are restarted, so that the called party's telephone number and the information that the calling party shall be detected are transmitted to the marker MKR.

The marker MKR in the embodiment of FIG. 3 connects the calling party's telephone SUB to a special junctor SPJ through the channel 2 and to the general trunk GOGT2 through a channel 3. In the embodiment of FIG. 4, the marker MKR connects the calling party's telephone SUB through the channel 2 to the special trunk SPOGT disposed between the originating office A and the terminating office B. The channel 2 in FIG. 3 or 4 is held by such relay means as the aforementioned relay MCO which is provided in the special junctor SPJ or trunk SPOGT.

Thus, according to the present invention, the communication channel can be held for malicious call tracing, and at the same time, when the calling party wanted to call newly after his telephone handset is put on, the connection for the calling party making a communication is advisable.

As described above, the present invention makes it possible easily and economically to detect the calling party and at the same time allows calling party's telephone to be used for calling again. The reason why this invention permits the calling party to make a new call is that, if the caller could not place a new call during the tracing procedure, the caller would probably be aware that his line was being held for tracing.

Further, it should be noted that the above-described embodiments do not limit the scope of the invention.

What is claimed is:

1. A system in an automatic telephone exchange for holding a communication channel consisting of tip, ring and sleeve wires by means of a sleeve wire circuit, said system comprising means for separating said sleeve wire into two segments, one segment for holding of the communication channel and another segment for the control of the calling party's line, and means for keeping said tip, ring and sleeve wires of the calling party's line disconnected from the communication channel which is held by said one segment of said sleeve wire for this purpose after the calling party once hangs up, thus permitting said calling party line to originate a new call during the held condition of said communication channel.

2. A system for holding a first communication channel in an automatic telephone having tip, ring and sleeve wires adapted to connect calling and called parties thereby forming communication channels, said system comprising:

means for separating said sleeve wire into two segments, the first segment adapted to permit the holding of a first communication channel formed by a calling party and the second adapted to simultaneously permit the formation of a second communication channel by said calling party, means for disconnecting said tip and ring wires and said second segment of said sleeve wire from said first communication channel and connecting the same to a second communication channel whereby said calling party may place a second call although the first communication channel remains held by said first segment of said sleeve wire to allow the telephone number of said calling party to be traced.

* * * * *